US008611784B2

(12) United States Patent
Uchida

(10) Patent No.: US 8,611,784 B2

(45) Date of Patent: Dec. 17, 2013

(54) IMAGE FORMING APPARATUS

(75) Inventor: Shinichi Uchida, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 294 days.

(21) Appl. No.: 13/152,178

(22) Filed: Jun. 2, 2011

(65) Prior Publication Data

US 2011/0299884 A1 Dec. 8, 2011

(30) Foreign Application Priority Data

Jun. 2, 2010 (JP) ................................. 2010-126635

(51) Int. Cl.

*G03G 15/00* (2006.01)

*H04N 1/04* (2006.01)

(52) U.S. Cl.

USPC ........... 399/110; 399/107; 399/114; 399/125; 399/380; 358/1.13; 358/296; 358/474

(58) Field of Classification Search

USPC .......... 399/107, 110, 114, 125; 312/119, 215, 312/223.2; 358/1.13, 474

See application file for complete search history.

(56) References Cited

U.S. PATENT DOCUMENTS

| | | | | |
|---|---|---|---|---|
| 7,680,431 | B2 * | 3/2010 | Ikebata | 399/107 |
| 7,873,303 | B2 | 1/2011 | Ohta et al. | |
| 8,208,834 | B2 * | 6/2012 | Yamaguchi | 399/125 |
| 2005/0031371 | A1 * | 2/2005 | Kaida et al. | 399/110 |
| 2006/0088336 | A1 * | 4/2006 | Hirose et al. | 399/110 |
| 2007/0047028 | A1 * | 3/2007 | Hashimoto et al. | 358/498 |
| 2007/0196128 | A1 * | 8/2007 | Ishihara et al. | 399/125 |
| 2008/0145098 | A1 * | 6/2008 | Ito | 399/114 |
| 2009/0169244 | A1 * | 7/2009 | Carter et al. | 399/110 |
| 2011/0134455 | A1 * | 6/2011 | Nagashima et al. | 358/1.13 |
| 2011/0299139 | A1 * | 12/2011 | Ikebata | 358/474 |

FOREIGN PATENT DOCUMENTS

| | | |
|---|---|---|
| JP | 2007251934 | 9/2007 |

* cited by examiner

*Primary Examiner* — David Gray

*Assistant Examiner* — Francis Gray

(74) *Attorney, Agent, or Firm* — Knobbe Martens Olson & Bear LLP

(57) ABSTRACT

An image forming apparatus including a housing body in which a first end is rotatably connected with an apparatus main body, a link member in which the second end can reciprocate in a first direction, a suspended portion positioned at a restricted position when the housing body is positioned at the closed position or the intermediate open position, and positioned at a non-restricted position when the housing body is positioned at the fully open position, and a tension spring in which one end is connected to the link member and the second end is connected to the suspended portion, and when the housing body is positioned at the closed position, and the tension spring is in an extended state, when the housing body is positioned at the intermediate open position or the fully open position, and the tension spring is in a free-length state.

6 Claims, 7 Drawing Sheets

IMAGE FORMING APPARATUS

This application is based on and claims the benefit of priority from Japanese Patent Application No. 2010-126635, filed on 2 Jun. 2010, the content of which is incorporated herein by reference.

BACKGROUND OF THE INVENTION

1. Field of the Invention

The present invention is related to an image forming apparatus such as a copying machine, a printer, a facsimile, or the like.

2. Related Art

The image forming apparatus includes apparatus main body, and a document conveyance apparatus or image reading means (for example, a scanner unit) disposed on an upper side of the apparatus main body. A document set in the document conveyance apparatus, or a document disposed on the scanner unit is optically read by the scanner unit.

An image forming apparatus that uses an electrophotographic process pre-charges a photosensitive drum contained in the image forming means, irradiates light onto the surface of the photosensitive drum to thereby form an electrostatic latent image, develops a toner image with a developing device, transfers the toner image with a transfer unit onto a recording material, fixes the toner image onto the recording material with a fixing unit, and thereby forms an image on the recording material.

The high-weight scanner unit is housed in the housing body. An image reading apparatus has been proposed that includes an opening/closing moveable configuration from a position at which the housing body is closed to an open position at which the inner portion of the apparatus main body is visible. A structure is disclosed in which consumable products such as toner containers, or the like, disposed in an inner portion of the image forming apparatus are configured in an attachable/detachable state by moving the housing body between an open and a closed position.

However, the opening and closing operation of the housing body described above is assisted by an assist spring in order to improve the operation performance of a user. The assist spring includes for example a torsion coil spring. However, the set load of a torsion coil spring is extremely large, and therefore makes assembly performance problematic.

In this regard, the assembly performance can be improved by using a tension spring as an assist spring to produce a return force to restore the free length when compressed by pulling in a longitudinal direction.

However, when the rotation angle in the housing body is large, a tension spring that has a high allowable stress to resist fatigue by cyclic stress must be provided, and therefore manufacturing costs were increased.

SUMMARY OF THE INVENTION

It is an object of the present invention to provide an image forming apparatus reduces a load on a spring, and that achieves both operating performance for a user and assembly performance.

The present invention includes an apparatus main body having a first surface and a second surface opposed in a first direction, and housing an image forming means that can output an image to a recording material, a housing body housing an image reading means that can optically read a document, disposed on an upper surface side of the apparatus main body, and in which a first end is rotatably connected near the second surface, the housing body rotatably displaces to a closed position at which the second end near to the first surface side is disposed in closest proximity to the apparatus main body, and a fully open position at which the second end is most separated from the apparatus main body, an intermediate open position between the closed position and the fully open position, a link member retaining the housing body, that is positioned at the fully open position, at the fully open position, the link member is configured to reciprocally displace in a first direction so that a first end is connected rotatably to the housing body, and a second end is positioned in closest proximity to a first position near the first surface when the housing body is positioned at the closed position, is positioned in closest proximity to a second position near the second surface when the housing body is positioned at a fully open position, and is positioned at a third position between the first position and the second position when the housing body is positioned at an intermediate open position, a guide portion formed to extend in a first direction on an upper side of the housing body, guiding the second end on the link member, and including a stopper formed near the second surface, a suspended portion disposed to reciprocally displace in a first direction near the second surface on the guide portion, the suspended portion positioned at a restricted position in abutment with the stopper when the housing body is positioned at the closed position or the intermediate open position, and positioned at a non-restricted position of the suspended portion near to the second surface and not in abutment with the stopper when the housing body is positioned at the fully open position, a tension spring in which one end is connected to the link member and the second end is connected to the suspended portion, the tension spring being in an extended state, and the second end disposed at a position corresponding to the restricted position when the housing body is positioned at the closed position, being in a free-length state, and the second end disposed at a position corresponding to the restricted position when the housing body is positioned at the fully open position, and being in a free-length state, and the second end disposed at a position corresponding to a non-restricted position closer to the second surface than the restricted position when the housing body is positioned at the intermediate open position.

DETAILED DESCRIPTION OF THE INVENTION

The preferred embodiments of the present invention will be described below making reference to the figures.

Figure 1:
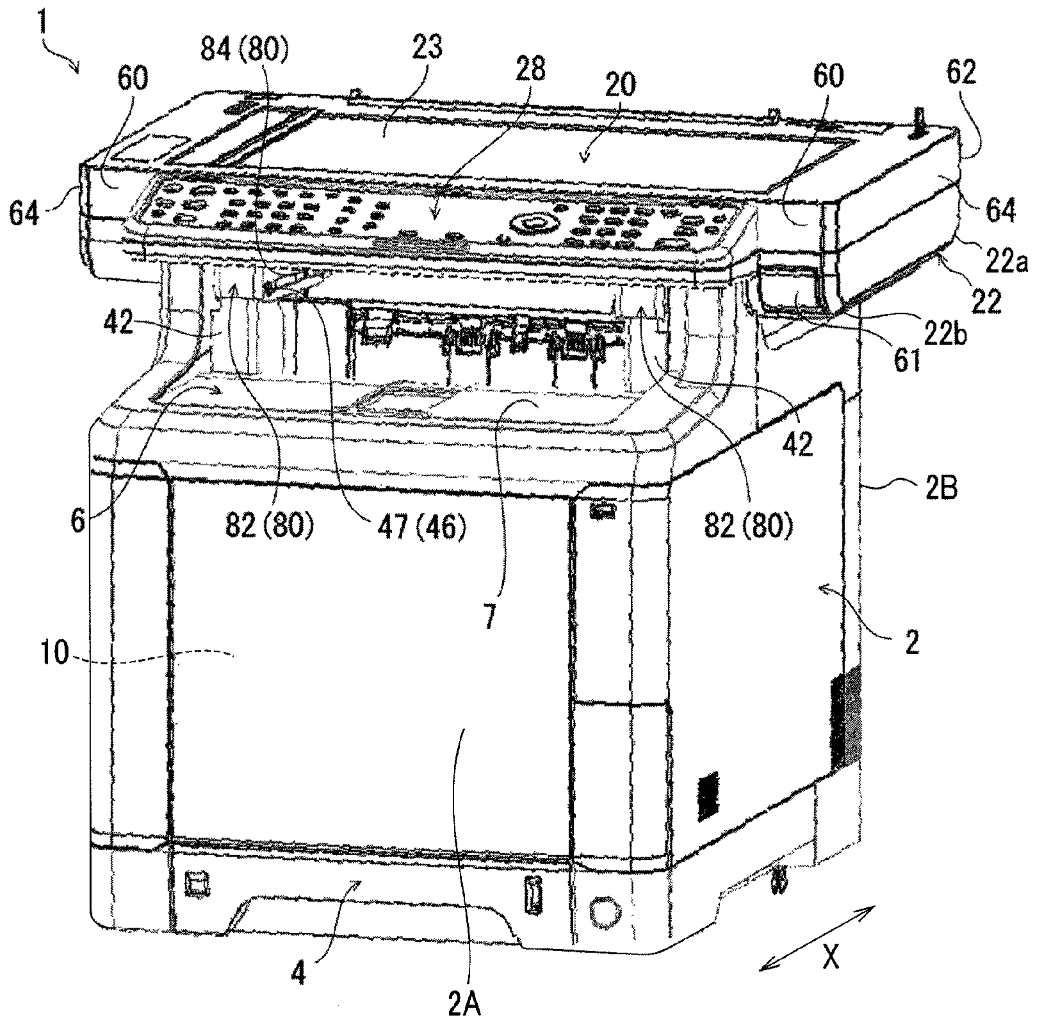
FIG. 1 is an external perspective view of a multifunction peripheral according to an embodiment.

FIG. 1 is an external perspective view of a multifunction peripheral according to an embodiment.

In FIG. 1, a digital multifunction peripheral that is an example of an image forming apparatus, (hereinafter referred to as "MFP1") is illustrated from the upper right front direction. In the figure, a front surface 2A and a right surface of the MFP 1 relative to a user are illustrated.

The MFP 1 includes a box-shaped apparatus main body 2 that houses a print engine 10 (image forming means) that can output an image to a sheet of paper (recording material). The sheet of paper on which an image is formed (outputted) by the print engine 10 is discharged to an upper side of the apparatus main body 2.

More specifically, the inner portion of the apparatus main body 2 is covered by an outer wall member 6 that is disposed thereupon. The surface 7 of the outer wall member 6 illustrated in FIG. 1 has the function of a discharge tray.

An optical scanner unit (image reading means) 20 is provided on an upper side of the apparatus main body 2 according to the present embodiment.

Although omitted from the figures, an automatic document feeder (hereinafter referred to as an ADF) can be mounted on an upper side of the scanner unit 20.

When the MFP 1 is used as a copying machine, a facsimile or a network scanner, the ADF conveys a document to a predetermined reading position in the scanner unit 20. Then, the scanner unit 20 optically reads an image of the document.

The scanner unit 20 is stored in the casing (housing body) described below. An operating panel 28 is provided on a front side of the casing 22.

The operation panel includes a plurality of operation keys that are used in various operations by a user and an operation screen that displays various types of information such as character information, guide images, or the like. The operational content of the panel and keys is notified to a controller 39.

A front-loading paper supply apparatus is disposed in a lower portion of the apparatus main body 2.

The supply apparatus includes a paper cassette 4 (FIG. 1). The paper cassette 4 stores paper in a stacked configuration with respect to a thickness direction. The paper cassette 4 is configured to be pulled out of the apparatus main body 2.

Figure 2:
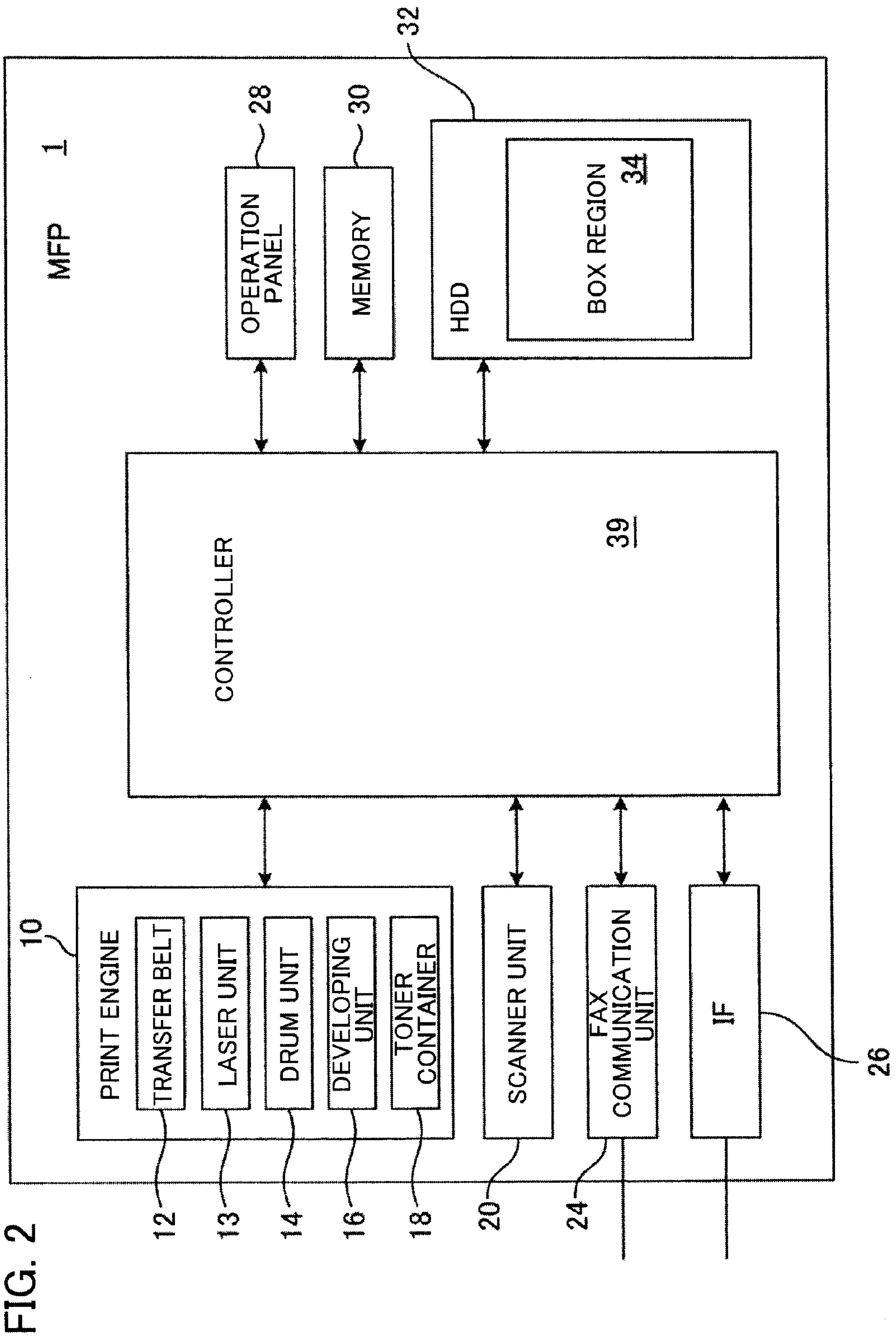
FIG. 2 is a block diagram of the multifunction peripheral.

FIG. 2 is a block diagram of the multifunction peripheral (MFP 1).

The MFP 1 is connected to a network through a network interface (IF) 26, and is also connected to a public line.

The MFP 1 executes various types of operations according to instructions from programs.

The MFP 1 includes for example a printing function (copy function), a transmission function (send function) and a storage function (box function).

A HDD 32 includes a box region 34. The HDD 32 successively stores various types of data including a print job sent from a client PC, a scan job read by the scanner unit 20, and a facsimile job received by the FAX communication unit 24, and includes a box function.

The MFP 1 includes a memory 30. The memory 30 includes a ROM, a RAM, or the like, and stores programs and the like for various types of operations.

The FAX communication unit 24 includes a send function, and sends a facsimile job stored in the HDD 32 to a partner address.

The print engine (image forming means) 10 is stored in the apparatus main body 2. The print engine 10 includes a laser unit 13 that forms an electrostatic latent image, a drum unit 14 that forms an electrostatic latent image corresponding to each color, toner containers 18 that store toner of each color, a developing unit 16 that develops a toner image using each type of toner in the toner containers 18, and an intermediate transfer belt 12 that transfers the toner image to a sheet of paper.

The print engine (image forming means) 10 forms (outputs) an image on a sheet of paper based on the print job stored in the HDD 32. The sheet of paper on which the image is formed (outputted) is discharged to the surface of the outer wall member 6. The print engine 10 includes a copy function.

The intermediate transfer belt 12, the drum unit 14, the developing unit 16, the toner containers 18, and the like are housed on an upper side of the paper cassette 4 in the apparatus main body 2. The toner containers 18 in the present embodiment are disposed from the front surface of the MFP 1 in order of magenta, cyan, yellow and black.

The longitudinal dimension of the casing 22 (housing body) according to the present embodiment is formed in a substantially rectangular shape that has a larger width than the width of the front surface of the MFP 1, and a contact glass 23 is disposed on an upper surface thereof (FIG. 1).

The constituent components of the scanner unit 20 are stored on a lower side of the contact glass 23 in the casing 22.

The scanner unit 20 includes a carriage, a CCD, or the like (both not illustrated) that reads the image data of the document. The carriage irradiates light towards the contact glass 23, and displaces along the longitudinal direction of the casing 22. The irradiated light is read by the CCD above, and converted to a predetermined signal.

The laser unit 13 forms an electrostatic latent image of the document image on a photosensitive drum of the drum unit 14 based on the image information read by the CCD.

Figure 3:
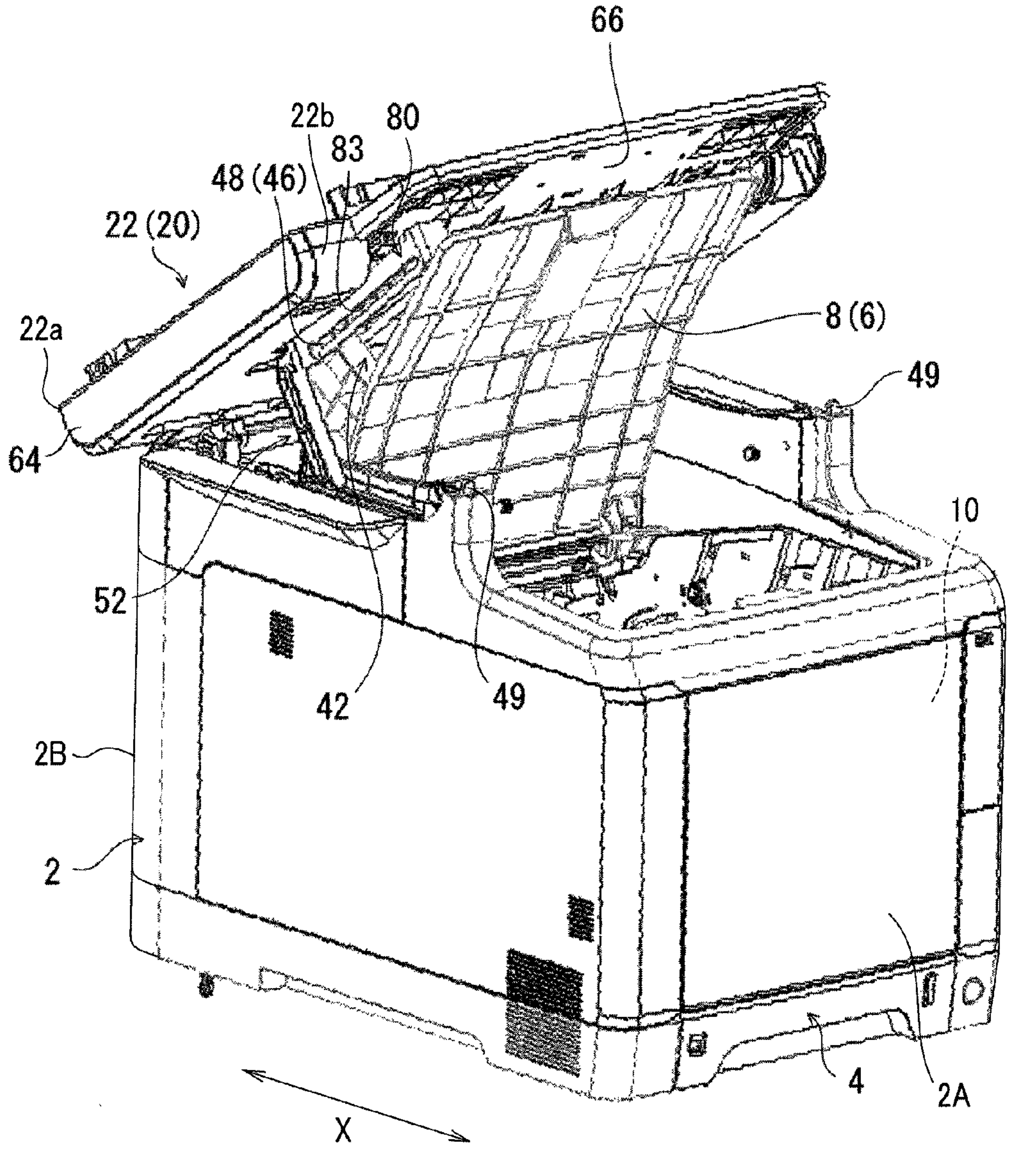
FIG. 3 is a perspective view of a multifunction peripheral in which a casing (housing body) is positioned at a fully open position, and an outer wall member is positioned at an exposed position that exposes an inner portion of the apparatus main body.
Figure 4:
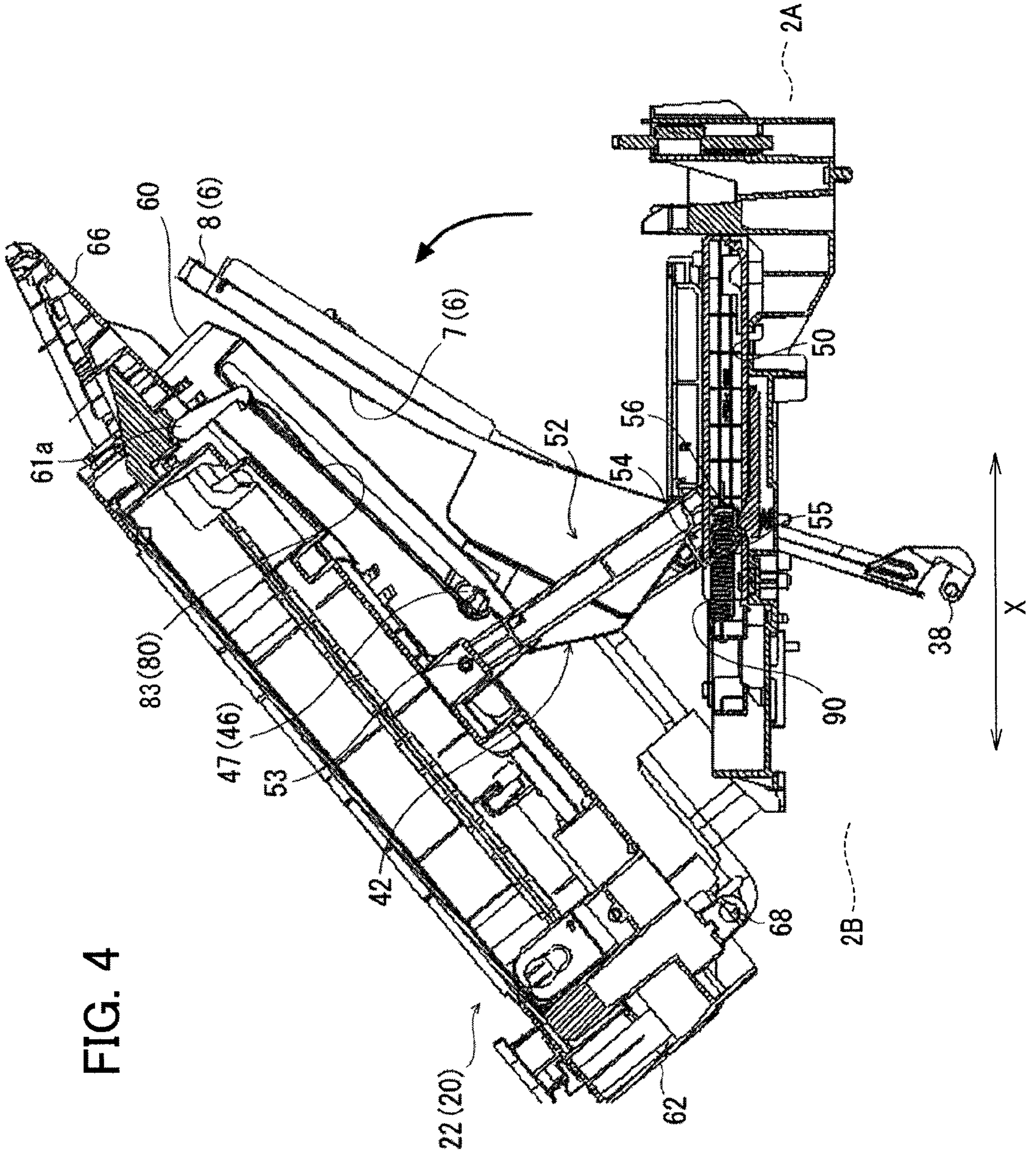
FIG. 4 is a side view of a state in which the casing (housing body) is positioned at a fully open position, and the outer wall member is positioned at the exposed position.
Figure 5:
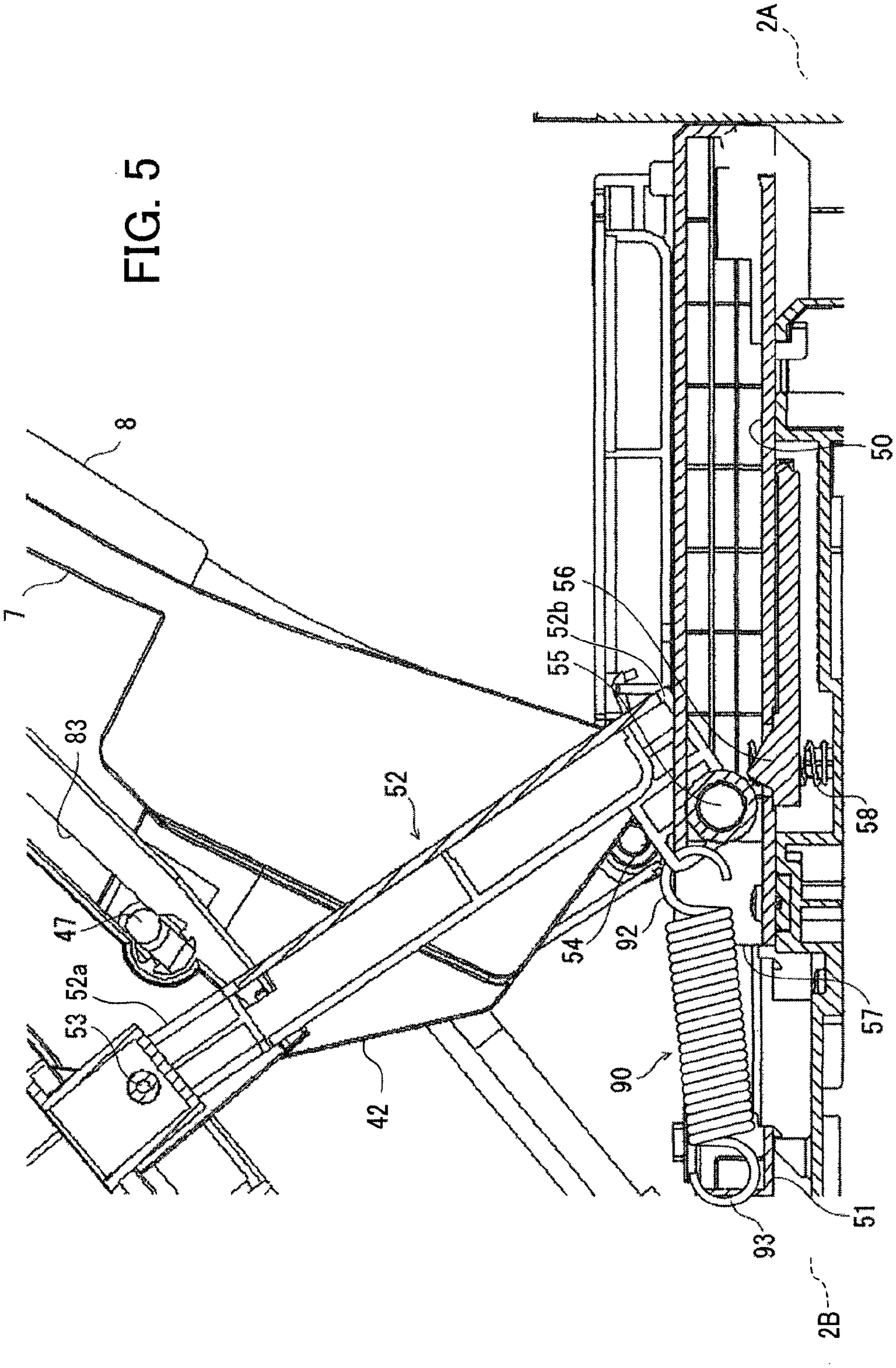
FIG. 5 is a schematic enlarged view of FIG. 4.
Figure 6:
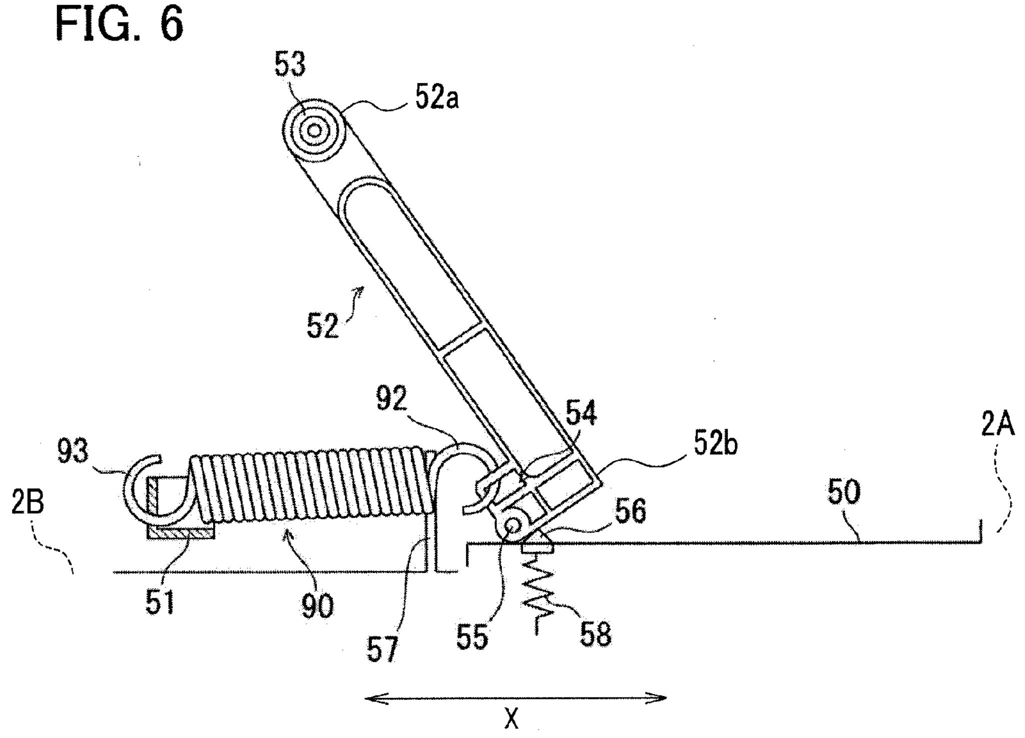
FIG. 6 is a side view of the retaining link in a state in which the casing (housing body) is positioned at the fully open position.
Figure 7:
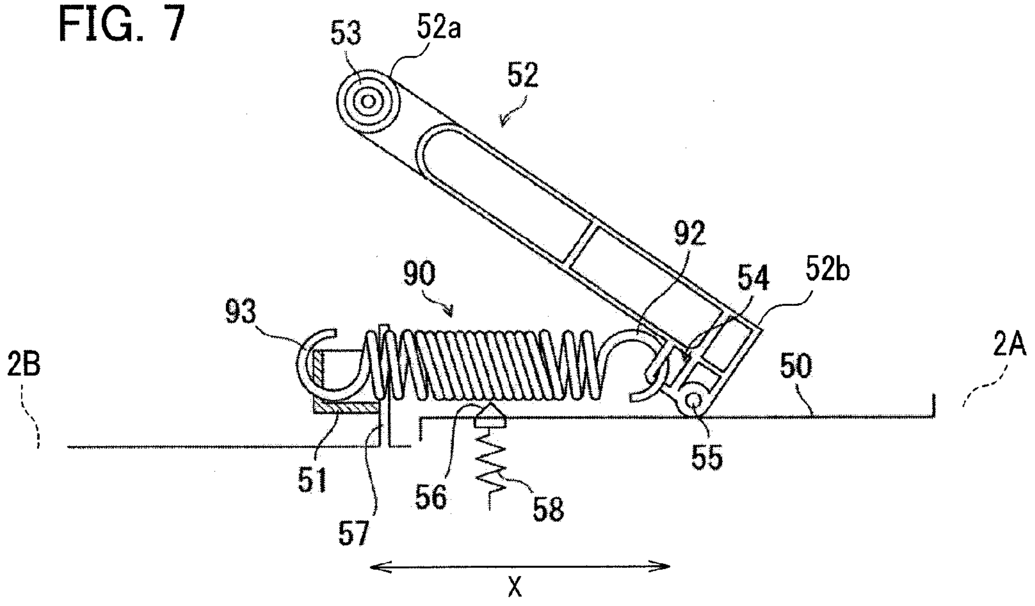
FIG. 7 is a side view of the retaining link in a state in which the casing (housing body) is positioned at the intermediate open position.
Figure 8:
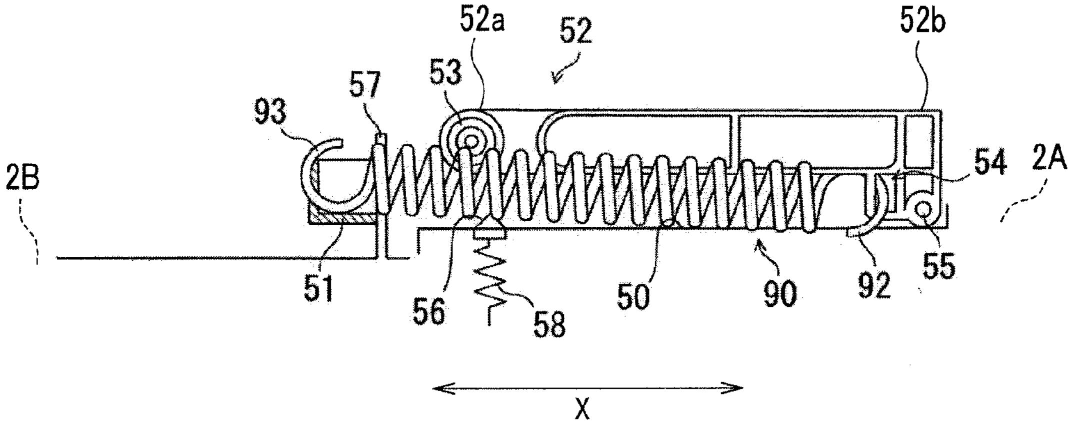
FIG. 8 is a side view of the retaining link in a state in which the casing (housing body) is positioned at the closed position.

FIG. 3 is a perspective view of a multifunction peripheral in which a casing (housing body) is positioned at a fully open position, and an outer wall member is positioned at an exposed position that exposes an inner portion of the apparatus main body. FIG. 4 is a side view of a state in which the casing (housing body) is positioned at a fully open position, and the outer wall member is positioned at the exposed position. FIG. 5 is a schematic enlarged view of FIG. 4. FIG. 6 is a side view of the retaining link in a state in which the casing (housing body) is positioned at the fully open position. FIG. 7 is a side view of the retaining link in a state in which the casing (housing body) is positioned at the intermediate open position. FIG. 8 is a side view of the retaining link in a state in which the casing (housing body) is positioned at the closed position.

The casing 22 houses the scanner unit 20 (image reading means) that enables optical reading of the document, and is disposed on an upper surface side of the apparatus main body 2. The casing 22 is connected to enable rotation of a first end 22*a* on the side with the back surface 2B (second surface) of the apparatus main body 2.

The casing 22 includes a upper surface that disposes the contact glass 23 (FIG. 3), and a lower surface 66 that covers the lower side or the like of the operation panel 28, and a front surface 60, back surface 62 and a side surface 64 that are formed to connect the upper surface and the lower surface 66.

The side surfaces 64, 64 are formed on both end portions in the longitudinal direction of the casing 22. A front surface 60 (open side, free end side and second end side of the housing body) on which the operation panel 28 is disposed on the front end of the side surfaces 64, 64 (front side in FIG. 1), and the back surface (supporting side, connecting end and first end of housing body) 62 is disposed to face the front surface 60 on the inner end (inner side in FIG. 1).

The casing 22 is mounted to freely rotate on the apparatus main body 2 at the reading support point 68 provided at a predetermined position of the back surface 62.

The casing 22 is mounted on the apparatus main body 2 to rotate and displace to a closed position at which the second end 22*b* near to the front surface 2A (first surface) side of the apparatus main body 2 is disposed in closest proximity to the apparatus main body 2 (FIG. 1), a fully open position at which the second end 22*b* is most separated from the apparatus main body 2 (FIG. 3), and an intermediate open position between the closed position and the fully open position.

The outer wall member 6 is disposed between the apparatus main body 2 and the casing 22. The outer wall member 6 is connected to the apparatus main body 2 to enable rotation at a non-exposed position at which the inner portion of the apparatus main body 2 is not exposed (FIG. 1) and at an exposed position at which the inner portion of the apparatus main body is exposed (FIG. 3). The outer wall member 6 is connected with the casing to rotate by displacing in response to the rotation of the casing 22. The outer wall member 6 is configured so that the rotation angle of the outer wall member 6 when the casing 22 is at the fully open position is larger than the rotation angle of the casing 22.

A suspension mechanism that is connected to the outer wall member 6 is provided on the lower surface 66 of the casing 22 at a position that faces the surface 7 of the outer wall member 6. More specifically, as shown in FIGS. 1, 3 and 4, the suspension mechanism includes an open rail 80, an arm portion 42, and a link pin 46. The open rail 80 is formed on the lower surface 66.

The open rail 80 is positioned respectively on the left and right ends of the surface 7 as illustrated in FIG. 1.

The open rail 80 includes a cylindrical main body 82 that is opened with respect to the top and bottom of the MFP 1.

The opening is formed in a rectangular shape, and extends from the front surface 2A (first surface) towards the back surface 2B (second surface) of the MFP 1.

An outer groove 83 and an inner groove 84 that penetrate the peripheral wall that communicates with each opening are formed on the cylindrical main body 82 (FIGS. 1, 3, 4).

FIG. 4 is a sectional view in which the right side of the open rail 80 (the inner side for example in FIG. 3) is seen from the front surface of the MFP 1 for example in FIG. 1.

More specifically, the inner groove 84 extends from the front surface 2A side of the MFP 1 towards the back surface 2B side on the inner peripheral wall of the cylindrical main body 82 (FIGS. 1, 4). The inner groove 84 is formed to extend in a first direction X.

On the other hand, the outer groove 83 extends in the same manner from the front surface 2A of the MFP 1 towards the back surface 2B on the outer peripheral wall of the cylindrical main body 82 (FIG. 3). The outer groove 83 is formed to extend in a first direction X.

The inner groove 84 and the outer groove 83 are disposed in a mutual opposed configuration. The outer groove 83 and the inner groove 84 are positioned at substantially the same height, and accommodate the link pin 46 that extends in a horizontal direction.

The link pin 46 is formed on the arm portion 42. The link pin 46 includes a head portion 47 and a leg portion 48. The head portion 47 is inserted into the inner groove 84. The leg portion 48 is inserted into the outer groove 83.

A hole that penetrates the peripheral wall of the cylindrical main body 82 is provided in proximity to an inner end of the outer groove 83 on the cylindrical main body 82, and the rotating portion 53 of the retaining link (retaining member) 52 described below is supported to rotate freely.

A hook member 61*a* that engages with the apparatus main body 2 is provided on the casing 22 (FIG. 4). The hook member 61*a* is formed near the front surface 2A on the lower surface 66. The hook member 61*a* is configured to project downwardly, and to engage on the right and the left projecting side of the apparatus main body 2 in proximity to the front surface 60.

Furthermore, as illustrated in FIG. 1, an operation lever 61 is disposed on the right front surface 60 of the operation panel 28. When a user pulls the operation lever 61 forward, the engagement of the hook member 61*a* and the apparatus main body 2 is released.

The arm portion 42 above is provided on the surface 7 of the outer wall member 6. The arm portion 42 is formed respectively on the right and left ends of the surface 7 (FIG. 1). The arm portion 42 is disposed between each peripheral wall that includes the outer groove 83 and the inner groove 84 from below the opening of the cylindrical main body 82.

When the casing 22 and the outer wall member 6 are connected through the link pin 46 that is disposed on the arm portion 42, the outer wall member 6 is suspended below the casing 22.

As illustrated in FIG. 4, an outer wall support point 38 is provided on the inner end of the outer wall member 6. The outer wall member 6 is mounted to rotate freely on the apparatus main body 2 in the same manner as the casing 22. The casing 22 and the apparatus main body 2 are connected on an outer side of the outer wall member 6. More specifically, the retaining link 52 that connects the casing 22 and the apparatus main body 2 is respectively provided further towards an outer side than the open rail 80 when viewed from the outer wall member 6.

A rotation portion 53 is formed on a first end 52*a* of the retaining link 52 (link member) (FIG. 4 and FIG. 5). The rotation portion 53 is connected to the hole above in proximity to the outer groove 83. The first end 52*a* of the retaining link 52 is rotatably connected to the casing 22.

A sliding portion 54 is formed on the second end 52*b* of the retaining link 52. The sliding portion 54 includes a round pin 55. The round pin 55 is inserted into the retaining rail 50 (guide portion) that is formed on the projecting right and left sides of the apparatus main body 2. The round pin 55 inserted into the retaining rail 50 is retained in a configuration enabling reciprocating displacement in a first direction X along the retaining rail 50. In this manner, the sliding portion 54 of the retaining link 52 (second end 52*b*) is configured to undergo reciprocating displacement in the first direction X.

More specifically, the sliding portion 54 (second end 52*b*) of the retaining link 52 is configured to undergo reciprocating displacement in the first direction X and be positioned at the first position that is closest to the front surface 2A (first surface) when the casing 22 is positioned at the closed position (FIG. 8), is positioned at the second position that is closest to the back surface (second surface) when the casing 22 is positioned at the fully open position (FIG. 6), and is positioned at a third position between the first position and the second position when the casing 22 is positioned at the intermediate open position (FIG. 7).

The retaining link 52 is configured to enable retention at the fully open position of the casing 22 when displaced to the fully open position.

The retaining rail 50 is formed to extend in a first direction X on an upper side of the apparatus main body 2. The retaining rail 50 guides the second end 52*b* on the retaining link 52.

The retaining rail 50 includes a stopper 57 for the suspending portion that is formed near the back surface 2B (second surface) in the first direction X.

The sliding portion 54 (second end 52*b*) is biased by an assisting tension coil spring (tension spring) 90 (FIG. 4 and FIG. 5).

The front end 92 (first end) of the tension spring 90 is connected to the sliding portion 54 (second end 52*b*) of the retaining link 52, and the rear end 93 (second end) is connected to the suspending portion 51.

The tension spring 90 is connected to the sliding portion 54 and the suspending portion 51 of the retaining link 52.

During an opening operation of the casing 22, that is to say, when the casing 22 displaces and rotates from the orientation in FIG. 1 (closed position) to the orientation in FIG. 3 (fully open position), the tension spring 90 displaces the sliding portion 54 rapidly toward the back surface 2B of the apparatus main body 2.

Furthermore, during a closing operation of the casing 22, that is to say, when the casing 22 displaces and rotates from the orientation in FIG. 3 (fully open position) to the orientation in FIG. 1 (closed position), the tension spring 90 has a damping function in which the sliding portion 54 is displaced slowly towards the front surface 2A of the apparatus main body 2.

When the casing 22 is positioned in the closed position, the tension spring 90 is in an extended state in which the rear end 93 (second end) is disposed at a position corresponding to the restricted position of the suspended portion 51 as described below.

When the casing 22 is positioned at an intermediate position, the tension spring 90 is in a free-length state in which the rear end 93 (second end) is disposed at a position corresponding to the restricted position.

When the casing 22 is positioned at a fully open position, the tension spring 90 is in a free-length state in which the rear end 93 (second end) is disposed at a position at which the suspended portion 51 described below corresponds to the non-restricted position that is closer to the back surface 2B (second surface) than the restricted position.

More specifically, when the casing 22 displaces and rotates from the closed position to the intermediate open position, the rear end 93 (second end) does not displace, but rather only the front end 92 (first end) displaces to the back surface 2B (second surface), and the tension spring 90 shifts from the extended state to the free-length state.

When the casing 22 displaces and rotates from the intermediate open position to the fully open position, the tension spring 90 displaces towards the back surface 2B (second surface) in a free-length state.

More specifically, when the casing 22 displaces and rotates from the closed position to the intermediate open position, the rear end 93 (second end) is determined to a position corresponding to the restricted position since the displacement of the suspended portion 51 is limited by the stopper 57 for the suspended portion, and the front end 92 (first end) is displaced towards the back surface 2B (second surface) by the retaining link 52, and therefore the tension spring 90 moves from an extended state to a free-length state.

When the casing 22 displaces and rotates from the intermediate open position to the fully open position, the front end 92 (first end) is displaced further towards the back surface 2B (second surface) by the retaining link 52, the tension spring 90 is in a free-length state, and then is displaced towards the back surface 2B (second surface) together with the suspended portion 51 that is connected to the rear end 93 (second end).

More specifically, when the casing 22 displaces and rotates from the fully open position to the intermediate open position, the tension spring 90 is displaced towards the front surface 2A (first surface) in a free-length state.

When the casing 22 displaces and rotates from the intermediate open position to the closed position, the rear end 93 (second end) does not displace, but rather only the front end 92 (first end) displaces to the front surface 2A (second surface) and the tension spring 90 shifts from the free-length state to the extended state.

More specifically, when the casing 22 displaces and rotates from the fully open position to the intermediate open position, the tension spring 90 is in a free-length state since the front end 92 (first end) is displaced towards the front surface 2A (first surface) by the retaining link 52, and is displaced towards the front surface 2A (first surface) together with the suspended portion 51 that is connected to the rear end 93 (second end).

When the casing 22 displaces and rotates from the intermediate open position to the closed position, the displacement of the rear end (second end) towards the front surface 2A (first surface) is restricted by the suspended portion 51, and the front end 92 (first end) is displaced further towards the front surface 2A (first surface) by the retaining link 52, and the tension spring 90 shifts from the free-length state to an extended state.

When a user draws the operation lever 61 of the MFP 1 forward in the configuration illustrated in FIG. 1 and releases the engagement of the hook member 61*a* and the apparatus main body 2, the front surface 60 of the casing 22 is raised approximately 10 mm from the apparatus main body 2. This is due to the fact that the casing 22 is pressed upwardly by a projection 49 illustrated in FIG. 3.

More specifically, a trigger spring (not shown) is provided respectively on the projecting right and left side of the apparatus main body 2, and biases the projection 49 upwardly. When the engagement of the hook member 61*a* and the apparatus main body 2 is released, the projection 49 presses the front surface 60 of the casing 22 upwardly with the biasing force of the spring.

Then, when the front surface 60 of the casing 22 is raised by a user, the open rail 80 becomes inclined, the rotating portion 53 of the retaining link 52 rotates from the front surface side of the MFP 1 relative to the open rail 80 toward the side surface, and the sliding portion 54 displaces from the front surface side of the MFP 1 along the retaining rail 50 towards the back surface. In this manner, the casing 22 starts to open in the direction of the arrow in FIG. 4 about the reading support point 68.

At the same time, since the open rail 80 inclines, the link pin 46 of the arm portion 42 of the outer wall member 6 is guided from the position on the right end of the outer groove 83 in FIG. 4 (the front of the outer groove 83 or the inner groove 84 in FIG. 3) to the position on the left end of the outer groove 83 (the inner position of the outer groove 83 or the inner groove 84 in FIG. 3). In this manner, the outer wall member 6 opens in the direction of the arrow in FIG. 4 about the outer wall support point 38 (rotation angle approximately 60°).

When the distance between the reading support position 68 and the outer wall support point 38 increases, the rotation angle of the outer wall member 6 (open angle) is further increased.

A stopper 56 (restricting portion) is provided on the retaining rail 50 (FIG. 5). The stopper 56 is provided at a position in contact with the sliding portion 54 of the retaining link 52 in the orientation illustrated in FIG. 3 and FIG. 4, and can maintain a fully opened position of the outer wall member 6.

That is to say, in a configuration in which the casing 22 is positioned at the fully open position, the stopper 56 (restricting portion) restricts displacement towards the front surface 2A (first surface) of the retaining link 52 that is disposed at the second position.

More specifically, the stopper 56 is biased upwardly by the stopper spring 58 (FIG. 5).

Firstly, when the sliding portion 54 displaces towards the back surface 2B of the MFP 1 along the retaining rail 50, and the sliding portion 54 comes into contact with the stopper 56, the stopper 56 is pressed below the retaining rail 50 against the biasing force of the stopper spring 58.

Then, when the sliding portion 54 displaces further towards the back surface 2B of the MFP 1 from the position to which the stopper 56 has been pressed, the stopper 56 protrudes above the retaining rail 50 due to the biasing force of the stopper spring 58, and engages with the sliding portion 54 (FIG. 5).

In this manner, the casing 22 that is opened in the direction of the arrow in FIG. 4 about the reading support point 68 is retained in the configuration illustrated in FIG. 3 and FIG. 4 (rotation angle: approximately 40°).

As illustrated in FIG. 3 and FIG. 4, when the back surface 8 of the outer wall member 6 is visible from an external position, a user can access, and can easily exchange the service units housed in the apparatus main body 2, for example in the present embodiment, the intermediate transfer belt 12, the drum unit 14, the developing unit 16, the toner containers 18, and the like.

As described above, due to the displacement of the sliding portion 54, the tension spring 90 can displace between the front surface 2A and the back surface 2B of the MFP 1 without change to the free-length state.

More specifically, the tension spring 90 is disposed in substantially a horizontal direction, and as illustrated in FIG. 5, includes a front end (first end) 92 positioned on the front surface side of the MFP 1 and a rear end (second end) 93 positioned on a back surface side of the MFP 1. The front end 92 is connected to the sliding portion 54 and the rear end 93 is connected to the suspended portion 51.

The suspended portion 51 is formed substantially in the shape of a letter L when in sectional view. The suspended portion 51 includes an upright wall portion near to the back surface 2B of the MFP 1. The rear end 93 of the tension spring 90 is hooked onto an upright wall portion.

The lower surface portion of the suspended portion 51 is supported (disposed) in a free state on the apparatus main body 2. The suspended portion 51 is disposed at a height that is substantially equal to the retaining rail 50. The suspended portion 51 is configured to undergo reciprocating displacement between the front surface 2A and the back surface 2B of the MFP 1 more towards the back surface 2B of the MFP 1 than the stopper 56.

The suspended portion 51 is disposed to undergo reciprocating displacement in the first direction X near to the back surface 2B (second surface) on the retaining rail 50 (guide portion).

When the casing 22 is in the closed position or the intermediate open position, the suspended portion is positioned at the restricted position in abutment with the stopper 57 for the suspended portion, and when the casing 22 is positioned at the fully open position, the suspended portion 51 is positioned at the non-restricted position near to the back surface 2B of the stopper 57 for the suspended portion (second surface), and not in abutment with the stopper 57 of the suspended portion.

That is to say, the stopper 57 for the suspended portion is disposed in an upright configuration on the apparatus main body 2 in proximity to the stopper 56. When the front end portion on the opposite side to the upright wall portion of the suspended portion 51 abuts with the stopper 57 for the suspended portion, the suspended portion 51 is prevented from displacing towards the front surface 2A of the MFP 1.

The displacement amount towards the back surface of the MFP 1 by the suspended portion 51 is determined by the length of the free length of the tension spring 90.

In other words, when the outer wall member 6 is at the fully open position (when the casing 22 is fully open), as illustrated in FIG. 6, the sliding portion 54 of the retaining link 52 is engaged with the stopper 56, the suspended portion 51 is positioned in closest proximity to the back surface 2B, and the tension spring 90 is in a free length state.

During a closing operation for the casing 22, that is to say, when a user presses the front surface 60 of the casing 22 downwardly, the sliding portion 54 presses the stopper 56 downwardly, and starts to displace along the retaining rail 50 from the back surface 2B towards the front surface 2A of the MFP 1.

At the same time, the tension spring 90 and the suspended portion 51 are pulled by the sliding portion 54, and start to displace from the back surface 2B towards the front surface 2A of the MFP 1. In other words, while a free-length state is maintained in which a spring load is not applied to the tension spring 90, the suspended portion 51 displaces towards the front surface 2A of the MFP 1 until contact with the stopper 57 of the suspended portion.

Then, when the outer wall member 6 (casing 22) displaces and rotates from a fully open configuration (rotation position) to a slightly closed configuration (rotation position), the sliding portion 54 passes over the stopper 56, displaces further along the retaining rail 50 towards the front surface of the MFP 1, and the suspended portion 51 comes into contact with the stopper 57 of the suspended portion. When the outer wall member 6 displaces and rotates further from the intermediate open position (the intermediate open position of the casing 22), the tension spring 90 in a free-length state starts to extend towards the front surface 2A of the MFP 1.

Thereafter, when the outer wall member 6 (casing 22) displaces and rotates, the sliding portion 54 displaces further towards the front surface 2A of the MFP 1. Then, the outer wall member 6 (casing 22) reaches the fully closed position illustrated in FIG. 1. When the outer wall member 6 (casing 22) is in the closed configuration, as illustrated in FIG. 8, the retaining link 52 shifts from an upright to a completely reclined configuration, and the sliding portion 54 reaches a closest proximity to the front surface 2A of the MFP 1.

The tension spring 90 that was prevented from displacing towards the front surface of the MFP 1 by the suspended portion 51 starts to expand, and adopts a maximum extended state in this configuration.

In contrast, when the casing 22 is closed, that is to say, when a user raises the front surface 60 of the casing 22 in a state in which the outer wall member 6 (casing 22) is disposed in a fully closed position (FIG. 1 and FIG. 8), the sliding portion 54 displaces along the retaining rail 50 towards the back surface 2B of the MFP 1, and the retaining link 52 starts to adopt an upright configuration. At the same time, the tension spring 90 in a maximally extended configuration starts to contract.

Then, even when the outer wall member 6 (casing 22) shifts from a fully closed configuration (rotation position) to a slightly open configuration (rotation position), the suspended portion 51 remains in contact with the stopper 57 for the suspended portion (due to the resilient force of the tension spring 90), and the tension spring 90 continues to contract (FIG. 7).

Then, the sliding portion 54 displaces further towards the back surface 2B of the MFP 1, and when the contracting tension spring 90 reaches a free-length state, the contact between the suspended portion 51 and the stopper 57 for the suspended portion is released. Then, the suspended portion 51 becomes separated from the stopper 57 for the suspended portion.

Thereafter, when the sliding portion 54 displaces further towards the back surface 2B of the MFP 1, the suspended portion 51 is pressed onto the tension spring 90 that is in a free-end state, and the line of extension of the retaining rail 50 displaces towards the back surface 2B of the MFP 1. Then, as illustrated in FIG. 6, when the retaining link 52 becomes upright and the sliding portion 54 is engaged with the stopper 56, the suspended portion 51 is positioned towards the back surface 2B by a length that corresponds to the free length of the tension spring 90.

As described above, according to the present embodiment, the casing 22 that houses the scanner unit 20 is rotatably supported with respect to the apparatus main body 2. When the casing 22 is opened (rotated) with respect to the apparatus main body 2, the outer wall member 6 is connected to displace in response to an opening operation of the casing 22. In this manner, a user can view the print engine 10 in the apparatus main body 2 from an external position. Furthermore, the configuration in which the casing 22 and the outer wall member 6 are opened is maintained by the retaining link 52.

The tension spring 90 is respectively connected to the sliding portion 54 and the suspended portion 51 of the retaining link 52. When the casing 22 and the outer wall member 6 are in the closed position (closed configuration), the tension spring 90 is extended, and when the casing 22 is opened, the tension spring 90 is compressed and assists in the displacement towards the open position of the casing 22.

In the present embodiment, a mechanism that includes a tension spring 90 improves operation performance for a user, in addition to improving assembly performance since there is no need for an extremely large set load during assembly.

The opening operation of the casing 22 continues after the tension spring 90 reaches a free length, and the free-length tension spring 90 slides towards the back surface of the MFP 1 together with the suspended portion 51.

In this manner, the extension amount of the tension spring 90 when the outer wall member 6 is in a fully closed configuration can be reduced to a low level when compared to a configuration in which the suspended portion 51 is fixed for example to the back surface of the MFP 1 and does not slide. Furthermore, the tension spring 90 does not have a free length when the outer wall member 6 is positioned at a fully open position, but rather has a free length before the fully open position (the point in time when the casing 22 is positioned at the intermediate open position). As a result, a large reduction in the load applied to the tension spring 90 is enabled, and the tension spring 90 can withstand cyclic fatigue.

The tension spring 90 has a free length when the outer wall member 6 is fully open (the fully open position is the position when the casing 22 is positioned at the fully open position), and the free-length tension spring 90 or the suspended portion 51 slides towards the front surface 2A of the MFP 1 in response to a closing operation of the casing 22. In other words, the closing operation of the casing 22 is executed when the tension spring 90 is in a free-length state.

Therefore, in comparison to a configuration in which the suspended portion 51 is assumed to be fixed to the back surface of the MFP 1 and does not slide at all, this configuration also enables the extension amount of the tension spring 90 to be reduced to a low level when the outer wall member 6 is in a fully closed configuration (the fully closed position is the position when the casing 22 is positioned at the closed position).

Furthermore, the free-length tension spring 90 does not start expanding from the point in time when the outer wall member 6 is positioned at the fully open position, but rather starts to expand after the sliding of the suspended portion 51 has been stopped. As a result, a large reduction in the load applied to the tension spring 90 is enabled, and the tension spring 90 can withstand fatigue by cyclic stress.

Furthermore, the tension spring 90 slowly closes the casing 22 by expanding in response to the closing operation of the casing 22. In the present embodiment, a mechanism that includes a tension spring 90 improves operation performance for a user, in addition to improving assembly performance since there is no need for an extremely large set load during assembly.

Furthermore, the tension spring 90 is normally in a free-length configuration when the suspended portion 51 is separated from the stopper 57 for the suspended portion. The tension spring 90 in this configuration starts to expand after the suspended portion 51 that slides in response to the closing operation of the casing 2 has abutted with the stopper 57 for the suspended portion. The MFP 1 ensures prevention of displacement of the suspended portion 51, and optimizes the design of the tension spring 90 in response to the position of the stopper 57 for the suspended portion.

Furthermore, when the open angle (rotation angle) of the outer wall member 6 is large relative to the open angle (rotation angle) of the casing 22, even when the open angle of the casing 22 is limited, the outer wall member 6 can be opened to a greater degree, and thereby facilitates access into the apparatus main body 2 by a user.

The present invention is not limited to the above embodiments, and various modifications may be added to a degree that does not depart from the scope of the patent claims.

For example, in the above embodiments, the casing 22 includes an outer wall member 6, and the back surface 8 of the outer wall member 6 covers the toner container 18, or the like. However, the invention is not limited to this embodiment, and for example, the lower surface 66 of the casing 22 may form the outer wall of the apparatus main body 2, and directly cover the toner container 18, or the like.

Furthermore, the MFP 1 is one example of an image forming apparatus, and the present invention may naturally be applied also to copying machines, printers, facsimiles or the like in which the apparatus main body is opened by an opening operation of a casing.

In all of the above configurations, as described above, the effect is obtained that the load on a spring can be reduced, and both operating performance and assembly performance for a user are achieved.

What is claimed is:

1. An image forming apparatus comprising:

an apparatus main body having a first surface and a second surface opposed in a first direction, and housing an image forming unit that outputs an image to a recording material;

a housing body for housing an image reading unit that optically reads a document, the housing body disposed on an upper surface side of the apparatus main body, and a first end of the housing body rotatably connected to the apparatus main body near the second surface, the housing body rotatably displacing to a closed position at which a second end of the housing body near to the first surface is disposed in closest proximity to the apparatus main body, a fully open position at which the second end is most separated from the apparatus main body, and an intermediate open position between the closed position and the fully open position;

a link member retaining the housing body, which has displaced to the fully open position, at the fully open position, a first end of the link member connected rotatably to the housing body, and the link member configured to reciprocally displace in the first direction so that a second end of the link member is positioned in closest proximity to a first position near the first surface when the housing body is positioned at the closed position, is positioned in closest proximity to a second position near the second surface when the housing body is positioned at the fully open position, and is positioned at a third position between the first position and the second position when the housing body is positioned at the intermediate open position;

a guide portion formed to extend in the first direction on an upper side of the housing body, guiding the second end of the link member, and including a stopper formed near the second surface;

a suspended portion disposed on the guide portion near the second surface to reciprocally displace in the first direction, the suspended portion positioned at a restricted position in abutment with the stopper when the housing body is positioned at the closed position or the intermediate open position, and at a non-restricted position near to the second surface and not in abutment with the stopper when the housing body is positioned at the fully open position;

a tension spring, one end of which is connected to the link member and the other end of which is connected to the suspended portion, the tension spring being in an extended state with the other end being disposed at a position corresponding to the restricted position when the housing body is positioned at the closed position, being in a free-length state with the other end being disposed at the position corresponding to the restricted position when the housing body is positioned at the intermediate open position, and being in a free-length state with the other end being disposed at a position corresponding to the non-restricted position closer to the second surface than the restricted position when the housing body is positioned at the fully open position, wherein when the housing body displaces and rotates from the fully open position to the intermediate open position, the tension spring displaces in the free-length state towards the first surface, and when the housing body displaces and rotates from the intermediate open position to the closed position, the second end does not displace, and only the first end displaces towards the first surface, the tension spring shifts from the free-length state to the extended state.

2. An image forming apparatus according to comprising:

an apparatus main body having a first surface and a second surface opposed in a first direction, and housing an image forming unit that outputs an image to a recording material;

a housing body for housing an image reading unit that optically reads a document, the housing body disposed on an upper surface side of the apparatus main body, and a first end of the housing body rotatably connected to the apparatus main body near the second surface, the housing body rotatably displacing to a closed position at which a second end of the housing body near to the first surface is disposed in closest proximity to the apparatus main body, a fully open position at which the second end is most separated from the apparatus main body, and an intermediate open position between the closed position and the fully open position;

a link member retaining the housing body, which has displaced to the fully open position, at the fully open position, a first end of the link member connected rotatably to the housing body, and the link member configured to reciprocally displace in the first direction so that a second end of the link member is positioned in closest proximity to a first position near the first surface when the housing body is positioned at the closed position, is positioned in closest proximity to a second position near the second surface when the housing body is positioned at the fully open position, and is positioned at a third position between the first position and the second position when the housing body is positioned at the intermediate open position;

a guide portion formed to extend in the first direction on an upper side of the housing body, guiding the second end of the link member, and including a stopper formed near the second surface;

a suspended portion disposed on the guide portion near the second surface to reciprocally displace in the first direction, the suspended portion positioned at a restricted position in abutment with the stopper when the housing body is positioned at the closed position or the intermediate open position, and at a non-restricted position near to the second surface and not in abutment with the stopper when the housing body is positioned at the fully open position;

a tension spring, one end of which is connected to the link member and the other end of which is connected to the suspended portion, the tension spring being in an extended state with the other end being disposed at a position corresponding to the restricted position when the housing body is positioned at the closed position, being in a free-length state with the other end being disposed at the position corresponding to the restricted position when the housing body is positioned at the intermediate open position, and being in a free-length state with the other end being disposed at a position corresponding to the non-restricted position closer to the second surface than the restricted position when the housing body is positioned at the fully open position, wherein when the housing body displaces and rotates from the fully open position to the intermediate open position, the tension spring is displaced in the free-length state towards the first surface together with the suspended portion that is connected to the second end since the first end is displaced towards the first surface by the link member, and when the housing body displaces and rotates from the intermediate open position to the closed position, a displacement of the second end towards the first surface is restricted by the suspended portion, the first end is displaced further towards the first surface by the link member, and the tension spring shifts from the free-length state to the extended state.

3. The image forming apparatus according to claim 1, further comprising a restricting portion for restricting the link member that is disposed at the second position from moving towards the first surface, when the housing body is positioned at the fully open position.

4. The image forming apparatus according to claim 1 further comprising an outer wall member, wherein the outer wall member is disposed between the apparatus main body and the housing body, connected to the apparatus main body to rotate to a non-exposure position at which an inner portion of the apparatus main body is not exposed and an exposure position at which the inner portion of the apparatus main body is exposed, and connected to the housing body to displace and rotate in response to displacement and rotation of the housing body, and the outer wall member is configured so that a rotation angle of the outer wall member is greater than a rotation angle of the housing body when the housing body is in the full open position.

5. The image forming apparatus according to claim 2, further comprising a restricting portion for restricting the link member that is disposed at the second position from moving towards the first surface, when the housing body is positioned at the fully open position.

6. The image forming apparatus according to claim 2 further comprising an outer wall member, wherein the outer wall member is disposed between the apparatus main body and the housing body, connected to the apparatus main body to rotate to a non-exposure position at which an inner portion of the apparatus main body is not exposed and an exposure position at which the inner portion of the apparatus main body is exposed, and connected to the housing body to displace and rotate in response to displacement and rotation of the housing body, and the outer wall member is configured so that a rotation angle of the outer wall member is greater than a rotation angle of the housing body when the housing body is in the fully open position.

* * * * *